(12) United States Patent
Yeom et al.

(10) Patent No.: US 10,334,651 B2
(45) Date of Patent: Jun. 25, 2019

(54) MOBILE TERMINAL AND CONTROL METHOD THEREOF

(71) Applicant: LG ELECTRONICS INC., Seoul (KR)

(72) Inventors: Hongju Yeom, Seoul (KR); Yuri Choi, Seoul (KR); Sumi Kim, Seoul (KR); Minseok Hwangbo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 15/107,599

(22) PCT Filed: Nov. 26, 2014

(86) PCT No.: PCT/KR2014/011434
§ 371 (c)(1),
(2) Date: Jun. 23, 2016

(87) PCT Pub. No.: WO2015/099299
PCT Pub. Date: Jul. 2, 2015

(65) Prior Publication Data
US 2016/0323927 A1    Nov. 3, 2016

(30) Foreign Application Priority Data

Dec. 24, 2013  (KR) .................. 10-2013-0162840
Jun. 10, 2014  (KR) .................. 10-2014-0070240

(51) Int. Cl.
*H04W 76/15*      (2018.01)
*H04W 76/30*      (2018.01)
(Continued)

(52) U.S. Cl.
CPC ....... *H04W 76/15* (2018.02); *H04W 72/0453* (2013.01); *H04W 76/25* (2018.02);
(Continued)

(58) Field of Classification Search
CPC .... H04H 20/61; G06Q 30/02; G06Q 30/0241; H04L 67/04; H04L 67/10; H04L 67/20;
(Continued)

(56) References Cited

U.S. PATENT DOCUMENTS 8,423,000 B2      4/2013  Dhuna
2006/0105712 A1*  5/2006  Glass .................. G06F 21/31
                                              455/41.2

(Continued)

*Primary Examiner* — Hardikkumar D Patel
(74) *Attorney, Agent, or Firm* — Birch, Stewart, Kolasch & Birch, LLP

(57) ABSTRACT

This document discloses an electronic device and a control method for the device. An electronic device according to the present invention and a control method for the device comprises a first wireless communication module; a second wireless communication module; and a controller obtaining information of contents from at least one different device through a first communication channel formed by the first wireless communication module and obtaining the contents through the first communication channel or forming a second communication channel by using the second wireless communication module on the basis of the information of the obtained contents and obtaining data of the contents through the second communication channel formed. According to the present invention, contents can be obtained through a better communication module between the first and the second wireless communication module.

18 Claims, 27 Drawing Sheets

(51) Int. Cl.
*H04W 76/25* (2018.01)
*H04W 72/04* (2009.01)
*H04W 88/06* (2009.01)
*H04J 13/16* (2011.01)

(52) U.S. Cl.
CPC ............. *H04W 76/30* (2018.02); *H04J 13/16* (2013.01); *H04W 88/06* (2013.01)

(58) Field of Classification Search
CPC ... H04L 63/0492; H04L 1/1607; H04L 43/08; H04L 43/0811; H04L 67/306; H04L 12/26; H04L 43/0882; H04L 43/0894; H04L 43/028; H04L 43/0876; H04L 69/162; H04W 76/025; H04W 72/0453; H04W 76/045; H04W 76/06; H04W 88/06; H04W 4/023; H04W 76/15; H04W 76/25; H04W 76/30; H04W 4/00; H04W 4/008; H04W 12/04; H04W 52/02; H04W 4/02; H04W 52/0229; H04W 64/003; H04W 4/206; H04W 24/04; H04W 24/10; H04W 24/08; H04J 13/16; H04B 5/0031; G06F 15/16; G06F 17/30; G06F 17/30743; H04M 3/42; H04M 1/7253; H04N 9/87; H04N 5/765; H04N 9/8205; H04N 21/4131; H04N 21/4302; H04N 21/4408; H04N 21/43615; H06Q 30/0241
See application file for complete search history.

(56) References Cited

U.S. PATENT DOCUMENTS

| | | | |
|---|---|---|---|
| 2012/0258692 A1* | 10/2012 | Luk .................. | H04M 3/42042 455/414.1 |
| 2012/0295541 A1* | 11/2012 | Kwon .................. | H04W 76/14 455/41.1 |
| 2013/0156012 A1 | 6/2013 | Raskin et al. | |
| 2013/0329532 A1 | 12/2013 | Sorias | |
| 2014/0004793 A1* | 1/2014 | Bandyopadhyay ......................... | H04L 63/0428 455/41.1 |
| 2014/0059206 A1* | 2/2014 | Venkateshwaran ......................... | H04L 43/0882 709/224 |
| 2014/0112155 A1* | 4/2014 | Lindoff ................ | H04W 24/08 370/242 |
| 2014/0178034 A1* | 6/2014 | Kim ...................... | H04N 5/765 386/230 |

* cited by examiner

FIG. 13

Unit:mA/h (a)

|  | Contents A | Contents B |
|---|---|---|
| WiFi | 2.78 | 1.77 |
| BT | 12.22 | 6.60 |

Unit:mA (b)

|  | Idle | Active |
|---|---|---|
| WiFi | 75 | 284 |
| BT | 15 | 239 |

MOBILE TERMINAL AND CONTROL METHOD THEREOF

CROSS REFERENCE TO RELATED APPLICATIONS

This application is the National Phase of PCT International Application No. PCT/KR2014/011434, filed on Nov. 26, 2014, which claims priority under 35 U.S.C. 119(a) to Patent Application Nos. 10-2013-0162840, filed in Republic of Korea on Dec. 24, 2013 and 10-2014-0070240, filed in Republic of Korea on Jun. 10, 2014, all of which are hereby expressly incorporated by reference into the present application.

TECHNICAL FIELD

The present invention relates to an electronic device capable of obtaining contents through a better communication module between a first and a second wireless communication module and a control method for the device.

BACKGROUND ART

Electronic devices can be divided into mobile/portable terminals or stationary terminals depending on their mobility. Mobile terminals can be further divided into handheld terminals and vehicle mounted terminals according to whether a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recent types of mobile terminals are capable of receiving broadcast and multicast signals providing visual contents such as videos and television programs.

Efforts are ongoing to support and to increase the functionality of mobile terminals. Such efforts include improvement of structural parts and/or software components of the mobile terminals.

Considerable research is now going on about wearable devices to be worn by a user, and various attempts are made to establish an optimized communication method between the existing mobile terminals and the wearable devices.

SUMMARY OF THE INVENTION

An object of the present invention is to provide a method to solve the above problem and other related problems. Another object of the present invention is to provide a mobile terminal capable of obtaining contents via a better communication module between a first and a second wireless communication module and a control method for the mobile terminal.

To achieve the object or the another object described above, one aspect of the present invention provides a first wireless communication module; a second wireless communication module; and a controller obtaining information of contents from at least one different device through a first communication channel formed by the first wireless communication module and obtaining the contents through the first communication channel or forming a second communication channel by using the second wireless communication module on the basis of the information of the obtained contents and obtaining data of the contents through the second communication channel formed.

The information of the contents includes at least one of the total size of the contents, type of the contents, and type of an application which has requested the contents.

The controller deactivates the first communication channel in case the second communication channel is formed.

The controller obtains the contents by forming an application layer, a framework layer, and a kernel layer, where the framework layer includes a service module obtaining information of the contents requested by a particular application in the application layer and determining whether to form the second communication channel.

The controller forms the second communication channel in case the size of the contents according to the information of the contents is larger than a reference value.

The controller obtains the contents data through either of the first and the second communication channel, where the total amount of current for obtaining the contents data is smaller than the other channel.

The controller deactivates at least one of the activated channels of the first and the second communication channel in case acquisition of contents using at least one of the activated channels of the first and the second communication channel is not carried out for a predetermined time period.

The controller determines whether to activate at least one of the first and the second wireless communication modules according to a distance of the electronic device to the different device or wearing of the electronic device.

According to another aspect of the present invention, a control method for an electronic device comprises obtaining information of contents from at least one different device through a first communication channel formed by using a first wireless communication module; and obtaining the contents through the first communication channel or forming a second communication channel using a second wireless communication channel on the basis of the information of the contents obtained through the first communication channel and obtaining the data of the contents through the second communication channel formed.

The information of the contents includes at least one of the total volume of the contents, type of the contents, and type of an application which has requested the contents.

In case the second communication channel is formed, the control method may further include deactivating the first communication channel formed.

The obtaining information comprises forming an application layer, a framework layer, and a kernel layer; forming a service module on the framework layer; and obtaining information of the contents requested by a particular application in the application layer, where the obtaining includes the service module's determining whether to form the second communication channel on the basis of the information of the contents.

The obtaining may comprise forming the second communication channel in case the size of the contents according to the information of the contents is larger than a reference value.

The obtaining may comprise obtaining the contents data through either of the first and the second communication channel, where the total amount of current for obtaining the contents data is smaller than the other channel.

The obtaining may further comprise deactivating at least one of the activated channels of the first and the second communication channel in case acquisition of contents using at least one of the activated channels of the first and the second communication channel is not carried out for a predetermined time period.

The following describe advantageous effects of an electronic device according to the present invention and a control method for the device.

According to at least one of the embodiments of the present invention, content can be obtained through a better communication module between a first and a second communication module.

The additional application scope of the present invention will be clearly understood from the detailed description below. Since various modifications and changes of the present invention within the technical principles and scope thereof should be clearly understood by those skilled in the art, detailed descriptions and particular embodiments such as preferred embodiments of the present invention should be understood simply as examples.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 12 and 13 illustrate a tethering operation of an electronic device according to one embodiment of the present invention;

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
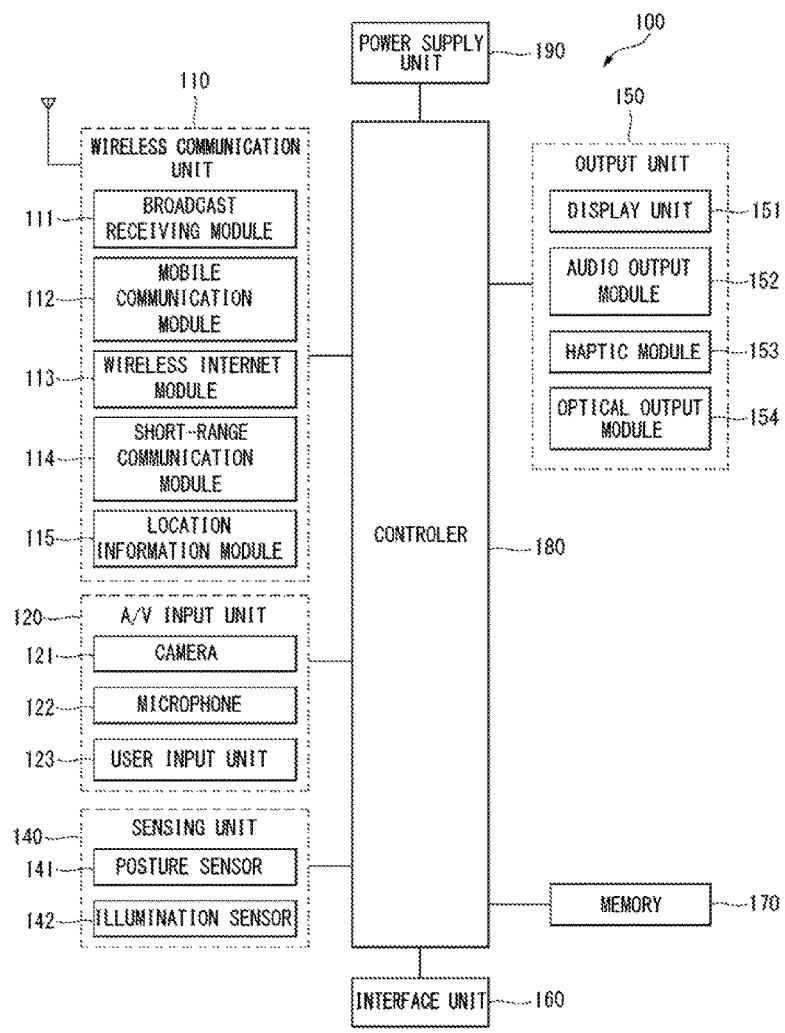
FIG. 1A is a block diagram of a mobile terminal in accordance with the present disclosure.
Figure 1B:
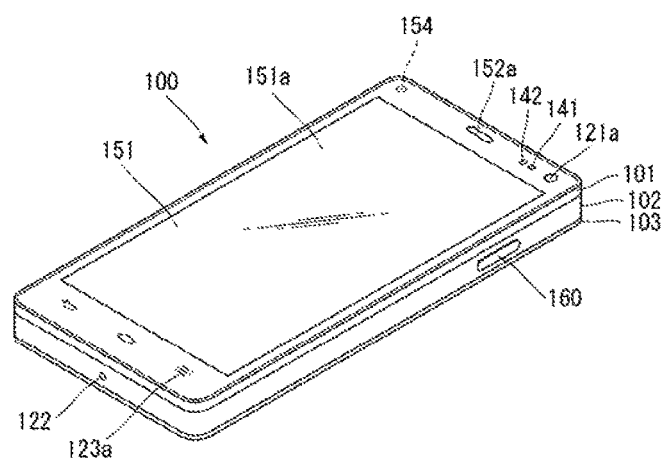
FIGS. 1B and 1C are conceptual views of one example of the mobile terminal, viewed from different directions.
Figure 1C:
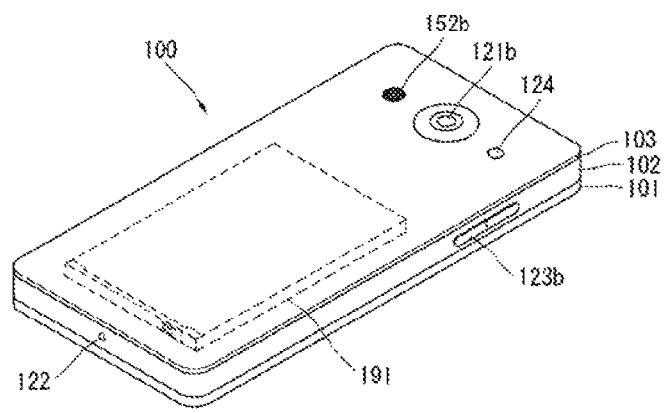

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
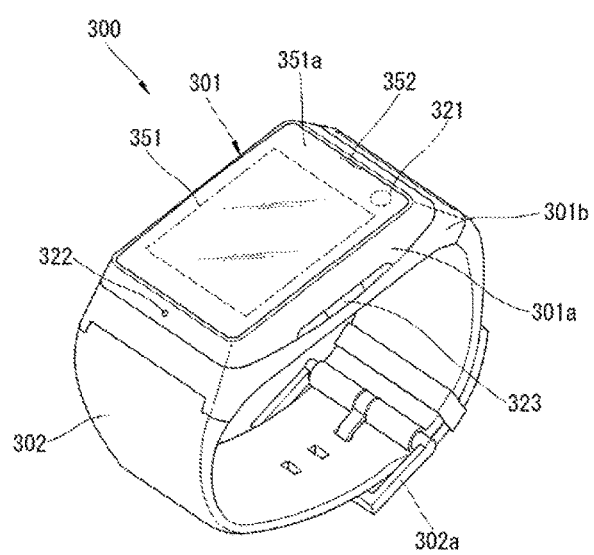
FIG. 2 is a conceptual view of a wearable mobile terminal according to another alternative embodiment of the present disclosure.

FIG. 2 is a perspective view illustrating one example of a watch-type mobile terminal 300 in accordance with another exemplary embodiment. As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 3:
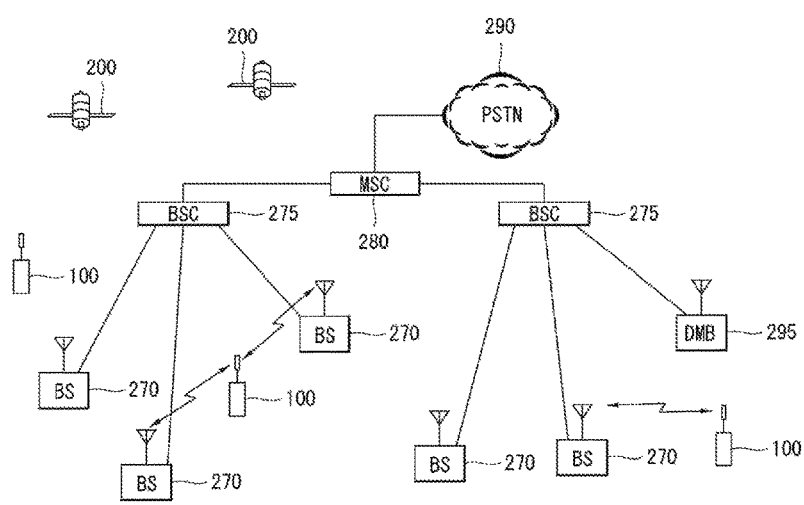
FIG. 3 is a block diagram of a CDMA wireless communication system communicating with the mobile terminal of FIG. 1.

With reference to FIG. 3, a CDMA wireless communication system comprises a plurality of mobile terminals 100, a plurality of base stations 270, Base Station Controllers (BSCs) 275, and Mobile Switching Centers (MSCs) 280. The MSC 280 is configured to be connected to a Public Switch Telephone Network (PSTN) 290. The MSC 280 is also configured to be connected to the BSCs 275. The BSCs 275 are connected to the base stations 270 through backhaul lines. The backhaul lines can be composed according to the E1/T1, ATM, IP, PPP, Frame relay, HDSL, ADSL, or xDSL known to those skilled in the art. It is also a well-known fact to those skilled in the art that the system can include two or more BSCs 275.

Each of the base stations 270 can include one or more sectors, and each sector can include an omnidirectional antenna or an antenna adjusted to direct to a particular emission direction from the base station 270. Different from the above, each sector may include two antennas meant for diversity reception. Each base station 270 is configured to accommodate multiple frequency assignments, and the frequency assignment can occupy a particular spectrum (for example, 1.25 MHz, 5 MHz).

The intersection of a sector and a frequency assignment can be called a CDMA channel.

The base stations 270 can also be called Base Station Transceiver Subsystem (BTSs). In some examples, the term of "base station" may be used to refer collectively to the BSC and one or more base stations 270. The base stations can also be called a "cell site". Different from the above, individual sectors of a given base station 270 may be called cell sites.

A terrestrial DMS transmitter 295 can broadcast a signal to the mobile terminals 100 operating in the aforementioned system. The broadcast reception module 111 of the mobile terminal 100 is usually configured to receive broadcast signals transmitted from the DMB transmitter 295. This configuration can also be applied similarly to broadcast and multicast signaling different from the above.

FIG. 3 shows a couple of Global Positioning System (GPS) satellites 200. These satellites 200 can track positions of a few or all of the mobile terminals 100. Although the figure shows only two satellites, it is a well-known fact for those skilled in the art that position information can be obtained from a larger or smaller number of satellites than illustrated. A different kind of position tracking technology (for example, the one replacing or augmenting the GPS technology) can be utilized. Depending on the needs, a few or all of the GPS satellites 200 can be configured to support satellite DMB transmission separately or additionally.

In the middle of operating a wireless communication system, the base stations 270 receive reverse link signals from a plurality of mobile terminals 100. The mobile terminal 100 may be in the process of handling a call, sending a message, or doing other type of communication. The base station receiving the reverse link signal processes the reverse link signal. The processed data is transmitted to the BSC 275 connected to the base station. The BSC 275 performs call resource allocation and provides a mobility management functionality including orchestration of soft handoff among base stations 270. The BSCs 275 also transmit the received data to the Mobile Switching Center (MSCs). The MSC 280 provides additional routing services for interfacing with the PSTN 290. Similarly, the PSTN 290 interfaces with the MSC 280, and the MSC interfaces with the MSCs 275. The BSCs 275 control the base stations 270 and transmit forward link signals to the mobile terminals 100 sequentially.

Figure 4:
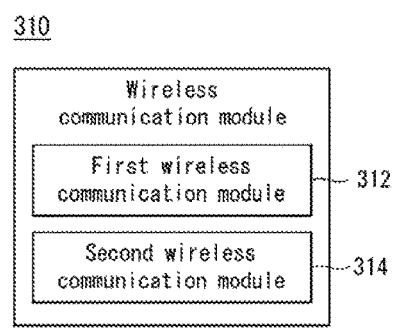
FIG. 4 is a block diagram of a wireless communication module of the electronic device of FIG. 2.

FIG. 4 is a block diagram of a wireless communication module of the electronic device of FIG. 2.

As shown in the figure, the wireless communication module 310 of an electronic device 300 according to one embodiment of the present invention comprises a plurality of modules. For example, the wireless communication module 310 comprises a first and a second wireless communication module 312, 314.

The first and the second communication module 312, 314 may use communication methods different from each other. For example, the first wireless communication module 312 is a WiFi communication module, while the second wireless communication module 314 is a Bluetooth communication module.

The controller 380 of the electronic device 300 can activate one of the first and the second wireless communication module 312, 314 or both of them simultaneously. For example, the controller 280 can selectively activate one of the first 312 and the second wireless communication module 314 or activate the second wireless communication module 314 while the first wireless communication module 312 is activated.

Activation refers to establishing communication to a different device through the corresponding communication module or being in a state where communication can be carried out. The controller of the electronic device 300 according to one embodiment of the present invention can activate the first and the second wireless communication module 312 at an optimal timing point.

Figure 5:
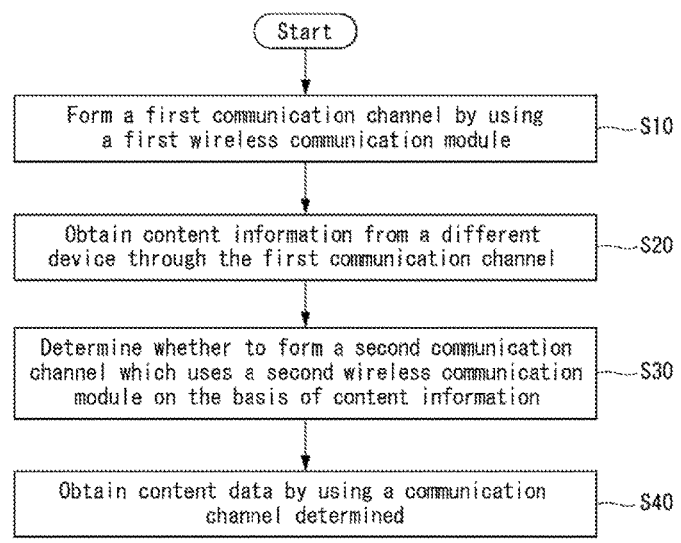
FIGS. 5 and 6 are flow diagrams illustrating operation of the electronic device of FIG. 2.
Figure 6:
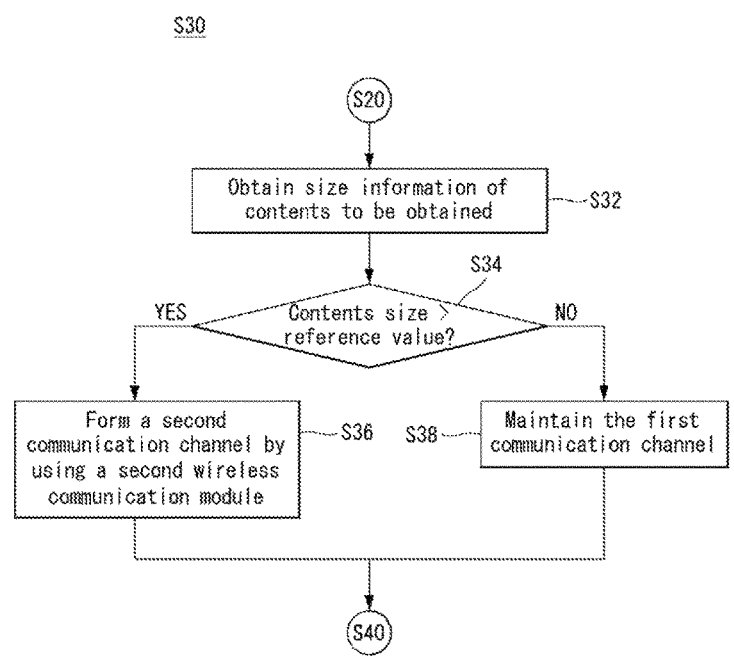

FIGS. 5 and 6 are flow diagrams illustrating operation of the electronic device of FIG. 2.

As shown in FIG. 5, the controller of the electronic device 300 according to one embodiment of the present invention can carry out the S10 step of forming a first communication channel by using the first wireless communication module 312.

The electronic device 300 can be a wearable device. For example, the electronic device can be at least one of the electronic device in the form of a watch worn by the user around his or her wrist, the electronic device in the form of glasses and/or the electronic device in the form of clothes.

The electronic device 300 can exchange data with other electronic devices of the user. For example, the user can use an electronic device 300, which is a wearable device, in addition to the mobile terminal 100 already in use. The mobile terminal 100 and the electronic device 300 can operate while exchanging data with each other. For example, the electronic device 300 attached to the user's body can sense a bio-signal of the user and transmit the sensed signal to the mobile terminal 100 or obtain content through the mobile terminal 100.

The first wireless communication module 312 can be one of the wireless communication modules prepared inside the electronic device 300. The first wireless communication module 312 can be a Bluetooth communication module. A Bluetooth communication module can exchange data by using a relatively small amount of current. However, the Bluetooth communication module is only able to transmit data with a relatively low speed.

The electronic device 300 may have a battery capacity less than the mobile terminal 100. In this sense, an efficient use of battery is an important matter.

The controller of the electronic device 300 can form a first communication channel by using a first wireless communication module 312 which is a Bluetooth communication module. In case the first communication channel is used, instantaneous battery usage may not be so large compared to that from other communication methods.

The controller of the electronic device 300 can carry out the S20 step of obtaining content information from a different device through a first communication channel.

The content information is related to the content that the controller attempts to obtain. For example, the content information can include at least one of the size and the type of the content. For example, the content information may be the header of the content. In other words, the content information may correspond to an information area which carries information about the content.

The controller of the electronic device 300 can carry out the S30 step of determining a second communication channel by using a second wireless communication module on the basis of the content information.

The controller of the electronic device 300 can determine the properties of the content on the basis of the content information obtained. For example, the controller can determine the size of the content to be downloaded and the type thereof.

The controller of the electronic device 300 can form a second communication channel by using a second wireless communication module 314 on the basis of the properties of the content determined. The second wireless communication module 314 may be a Wi-Fi communication module.

A Wi-Fi communication module can communicate data with a relatively high speed. In other words, a Wi-Fi module is capable of performing data communication with a speed higher than the Bluetooth communication. It should be noted, however, that instantaneous battery consumption of the Wi-Fi communication module can become relatively large.

The controller of the electronic device 300 can form a second communication channel in case the size of the content to be downloaded exceed a predetermined value. In other words, in the case of large-sized content, the second communication channel can be further utilized so that the corresponding content can be downloaded quickly within the shortest time period. When the second communication channel is employed, instantaneous battery usage can be increased. However, if the total amount of time involving an additional use of a communication channel is small, the overall battery usage can be small compared with the case of using the first communication channel.

The controller can determine the total amount of battery used on the basis of the content information separately for the case where content data are downloaded through the first communication channel and the case where content data are downloaded through the second communication channel. In other words, the controller can determine whether to use the first communication channel providing a long battery lifetime at the expense of low instantaneous battery power or to use the second communication channel providing a short battery lifetime for the sake of large instantaneous battery power.

The controller can carry out the S40 step of obtaining content data by using the determined communication channel. Also, the controller can carry out the process of activating the initial communication channel once data acquisition of the content is completed. For example, if it is the case that the second communication channel is employed, the second communication channel is deactivated and the first communication channel is activated again.

FIG. 6 illustrates one example of the step (S30) of determining forming a second communication channel. In other words, the figure illustrates the case where formation of the second communication channel is determined on the basis of the size of content data from among several factors which determine formation thereof.

The S30 step of determining formation of the second communication channel can comprise the step S32 of obtaining size information of the content to be obtained.

The content size is compared with a reference value S34 and if the content size is larger than the reference value, the controller forms the second communication channel S36 by using the second wireless communication module 314; in other case, the controller maintains the first communication channel S38.

The reference value may assume the size of content data optimized for battery use. For example, if content data size is larger than the reference value, it is advantageous to download the content quickly within a short time period to reduce the total amount of battery consumption.

Figure 7:
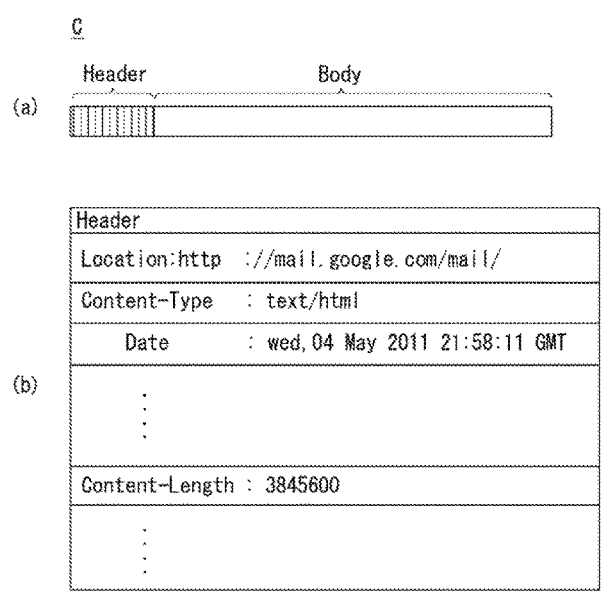
FIG. 7 shows how content is composed.

FIG. 7 shows how content is composed.

As shown in the figure, the content C according to one embodiment of the present invention can be composed of a header and content body. The header carries information of the content C, and the content body carries data of the content C.

The header may include information of the content C. For example, the header may include the position, type, and creation date of the content. Furthermore, the header may include information about the size of the content. For example, the size of the content may correspond to "Content-Length" information included in the header.

The controller, on the basis of information about content size included in the header of the content C, can activate or deactivate a particular wireless communication module.

Figure 8:
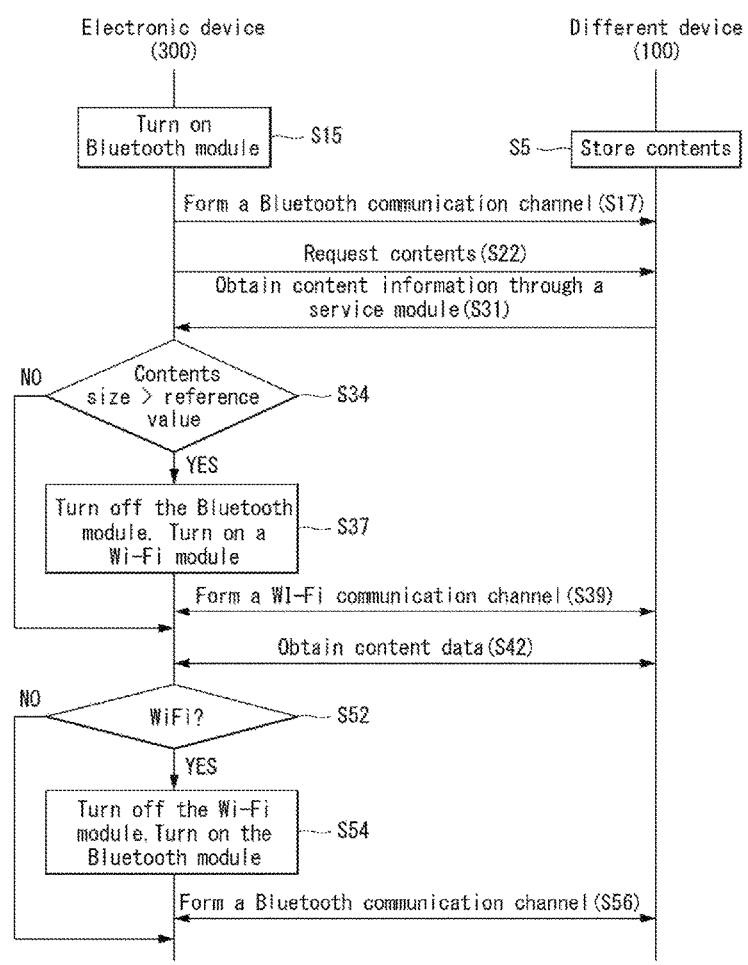
FIG. 8 is a signal flow graph illustrating a relationship between a different device and an electronic device according to one embodiment of the present invention.

FIG. 8 is a signal flow graph illustrating a relationship between a different device and an electronic device according to one embodiment of the present invention.

As shown in the figure, a different device 100 and an electronic device 300 according to one embodiment of the present invention can exchange a predetermined signal.

The different device 100 can have content S5.

The electronic device 300 turns on a Bluetooth module S15 and forms a Bluetooth communication channel with the different device 100, S7.

The electronic device 300 requests S22 content from the different device 100 and obtains content information through a service module S31.

The service module may be a module generated on the framework of the electronic device 300. The service module will be described in more detail in the corresponding part of this document.

The electronic device 300 can determine whether the content size is larger than a reference value S34 on the basis of content size information included in the content information.

In case the content size is larger than the reference value, the Bluetooth module is turned off and the Wi-Fi module is turned on S37.

By using the activated Wi-Fi module, the S39 step of forming a Wi-Fi communication channel can be carried out. At the same time, the Bluetooth communication channel can be released by turning off the Bluetooth module.

The S42 step of obtaining content data can be carried out.

The content data can be obtained through a newly formed Wi-Fi module. For example, the content header can be obtained through the existing Bluetooth communication channel, but the content body can only be obtained through a newly formed Wi-Fi module.

The content data can be obtained through the existing Bluetooth communication channel in case the content size is not larger than the reference value.

By checking whether the Wi-Fi module is in a power-on state S52, the Wi-Fi module is turned off and the Bluetooth module is turned on S54 and a Bluetooth communication channel is formed S56.

Bluetooth communication may consume less current than Wi-Fi communication. Therefore, once transmission of large volume content is completed, the Wi-Fi module is made to be deactivated but the Bluetooth module is activated, thereby keeping current consumption to be low.

Figure 9:
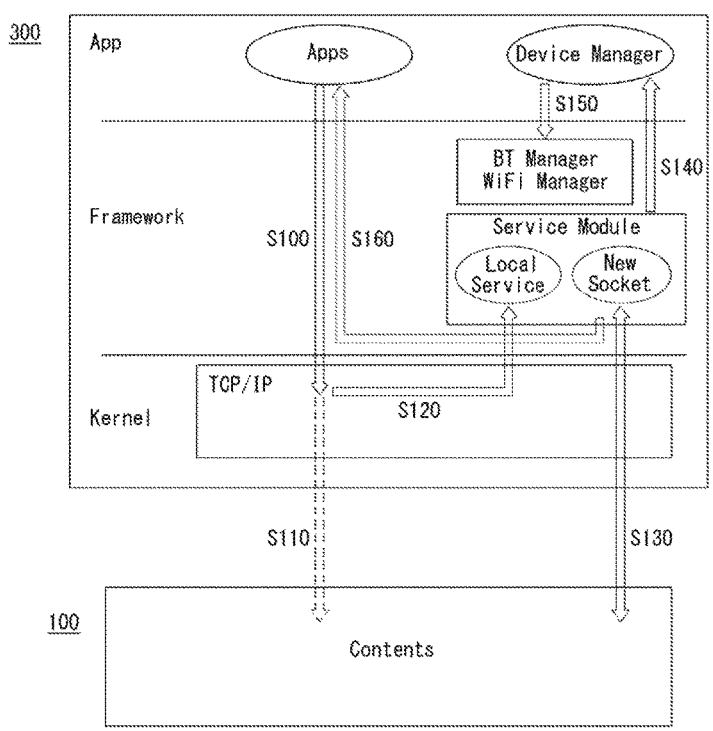
FIGS. 9 to 11 illustrate operation of an electronic device according to various embodiments of the present invention.
Figure 10:
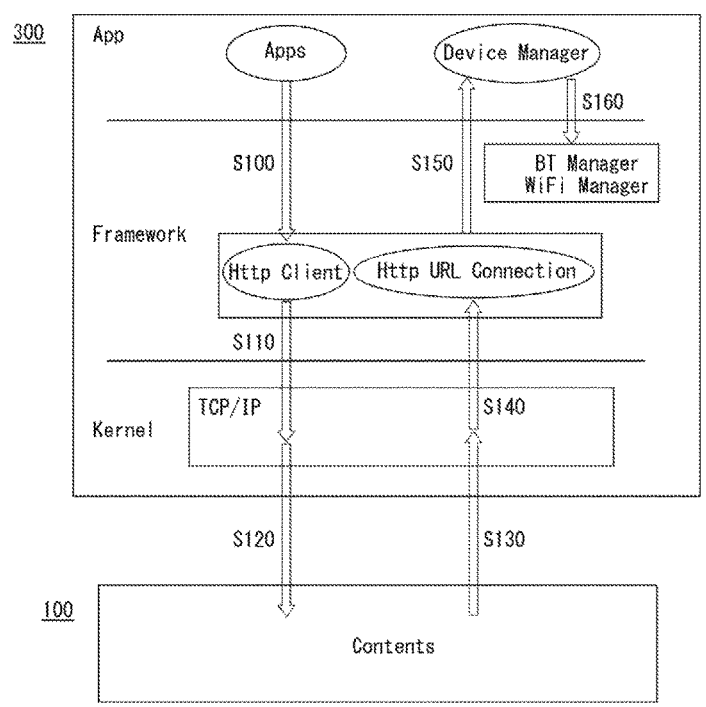
Figure 11:
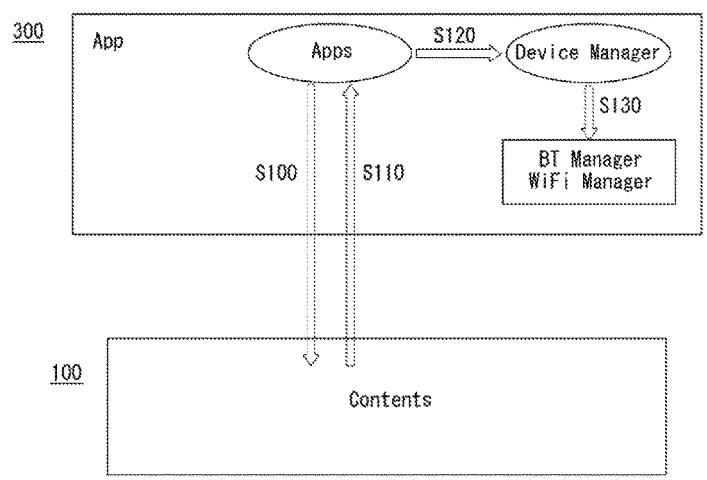

FIGS. 9 to 11 illustrate operation of an electronic device according to various embodiments of the present invention.

As shown in FIG. 9, the electronic device 300 according to one embodiment of the present invention can receive content from a different device 100. For example, a watch-type or glass-type electronic device 300 can receive content from the user's mobile terminal. Such a feature can be easily understood if one takes into account the characteristics of the electronic device 300 which is relatively small and provides a relatively small storage compared with the mobile terminal of the user.

An application layer, a framework layer, and kernel layer may be formed logically or physically inside the electronic device 300.

In the application layer, various applications are carried out. An application may request particular content for its operation. The particular content may be stored in the mobile terminal 100. In this case, the application may send the corresponding request to the kernel layer S100.

The kernel layer, receiving a request from the application, redirects the corresponding request to a service module in the framework layer through a TCP/IP module 120. This feature is different from the existing process where a request is transferred to a different device 100 through the TCP/IP module S110.

The service module in the framework layer can create a local server and/or a new socket on the basis of a received request. The service module transfers the corresponding request to a different device 100 via the kernel layer and starts receiving content from the different device 100 S130. For example, this implies that starting from the header, the service module can start receiving part of the content.

The service module which has obtained the content can know the overall size of the corresponding content on the basis of content information. If the content size is larger than a reference value, the service module requests a device manager of the application layer to control a communication module S140. The device manager which has received the request commands a BT manager of the framework layer and/or a Wi-Fi manager to turn on and/or off the corresponding module S150.

The service module can transfer a socket to the application along with a request for the device manager or when there is a response from the device manager S160. The application which has received the socket may continue to obtain the corresponding content.

The content may be obtained through a communication module different from the one involved when the content was initially requested. In other words, if the content size is larger than a reference value, a Bluetooth communication channel can be changed to a Wi-Fi communication channel. Therefore, battery consumption can be made small while content can be obtained quickly.

As shown in FIG. 10, an electronic device 300 according to another embodiment of the present invention can carry out activation or deactivation of the Bluetooth and/or Wi-Fi module by using a HTTP client module and/or HttpURL Connection module of the framework layer.

A content request 5100 of an application can be transferred to a TCP/IP module of the kernel layer through the HTTP client module S110. The TCP/IP module can transfer the corresponding request to the different device 100, S120.

The different device 100 transfers the content to the TCP/IP module of the electronic device 300 and the TCP/IP module transfers the content to the HttpURL Connection module S140.

The HttpURL Connection module can determine the overall size of the corresponding content through the header which contains information of the received content. If the content size is larger than a reference value, the HttpURL Connection module requests the device manager to deactivate the communication module S150.

The device manager can transfer a command to the BT manager and/or Wi-Fi manager S160. If the Wi-Fi wireless communication module is deactivated by the command, the content can be received through the Wi-Fi communication module afterwards.

As shown in FIG. 11, an application can directly request the electronic device 300 according to a yet another embodiment of the present invention to change the communication module. In other words, the application which has obtained S11 part of the content from a request given to the different device 100 may request S120 the device manager to change the communication module.

Figure 12:
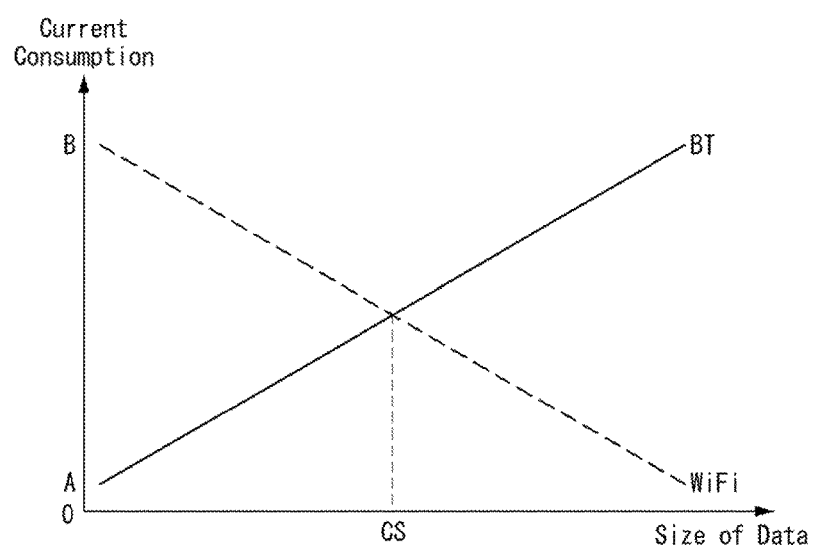

FIGS. 12 and 13 illustrate a tethering operation of an electronic device according to one embodiment of the present invention.

As shown in the figure, an electronic device 300 according to one embodiment of the present invention can carry out a tethering operation utilizing an optimized communication module.

FIG. 12 shows a relationship between the amount of current consumed and data size. In other words, in case the size of the content to be received is small, it may be advantageous in view of current consumption to use a Bluetooth communication channel to receive content data. This results from the fact that the Bluetooth communication channel is more suitable for a low-current operating condition than the Wi-Fi communication channel.

If the data size of the content to be obtained exceeds a reference value (Contents Size (CS)), the Wi-Fi communication channel is more advantageous to receive data in view of current consumption. This can be understood if one takes into account the fact that although the instantaneous current consumption of the Wi-Fi communication channel is large, transfer speed thereof is higher than the Bluetooth communication channel. In other words, even though the instantaneous current consumption of the Wi-Fi communication channel is large, the overall current consumption can be made small due to the capability of transmitting data in a short time period.

FIG. 13(a) shows an amount of current consumed according to content size. In the figure, contents A and contents B may be of relatively large size. For example, the contents A amounts to about 30 megabytes while the contents B amounts to about 15 megabytes.

In case a Wi-Fi communication module is used to obtain the contents A and B, the overall current consumption is smaller than the Bluetooth communication module. The overall current consumption is calculated by multiplying the current value with time. Therefore, even if large current is used, the overall current consumption can be small if a time period for the large current is short. The transmission speed due to the Wi-Fi communication module is about seven-fold faster than that from the Bluetooth communication module. Thus, even if the instantaneous current consumption of the Wi-Fi communication module is large, the total amount of current actually consumed for the Wi-Fi communication module to download the whole contents may be smaller.

FIG. 13(b) shows an amount of current consumed when a web browser application is used. As shown in the figure, the Wi-Fi communication module consumes 75 mA in an idle state while the Bluetooth communication module consumes 15 mA. In an active state, the Wi-Fi communication module consumes 284 mA while the Bluetooth communication module consumes 239 mA. In other words, in the case of using a web browser, it is advantageous to use the Bluetooth communication module for both of the idle and the active state. This can be understood clearly if one takes into account the fact that in a typical usage pattern, a web browser application usually stays in the idle state more often.

Figure 14:
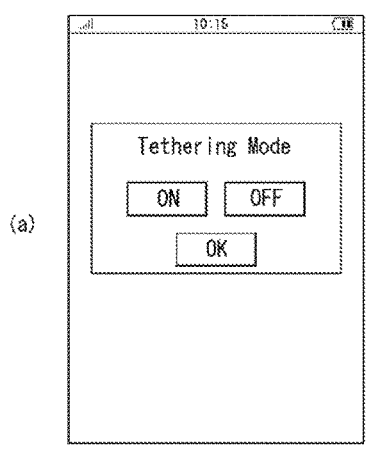
FIGS. 14 to 16 illustrate a screen for selecting a tethering operation according to one embodiment of the present invention.
Figure 14:
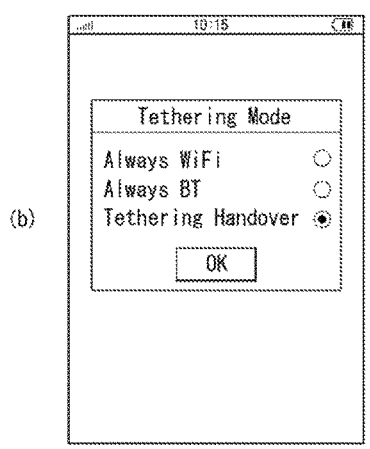
Figure 15:
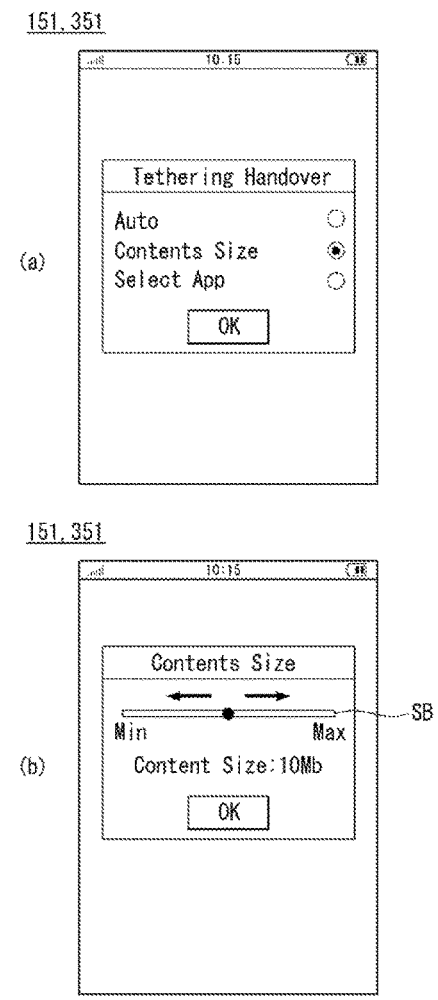
Figure 16:

FIGS. 14 to 16 illustrate a screen for selecting a tethering operation according to one embodiment of the present invention.

As shown in the figure, the user and/or the controller can carry out a predetermined, pre-configuration process for a tethering operation according to one embodiment of the present invention.

As shown in FIG. 14(a), the display unit 151, 351 may display a screen for determining whether to activate a tethering mode.

The display unit 151, 351 may represent a display unit of an electronic device 300 and/or a display unit of a different device 100. For example, in the case of a watch-type electronic device, a series of processes may be carried out through a screen of a different device 100 connected to the watch-type electronic device 300 since the screen thereof is relatively small. However, if the screen of the electronic device 300 is sufficiently large, a series of processes can naturally be carried out through the screen of the electronic device 300. In what follows, the same scheme will be applied unless described otherwise.

As shown in FIG. 14(b), the tethering mode is defined for the case where only the Wi-Fi module is employed, the case where only the Bluetooth module is employed, and the case where the Wi-Fi module and the Bluetooth module are employed interchangeably depending on a particular condition. The user and/or the controller can choose one of the operating cases above.

As shown in FIG. 15(a), when the option of employing Wi-Fi and Bluetooth modules interchangeably is chosen, a process of selecting a criterion for switching between the two modules can be carried out. For example, the switching may be carried out automatically by the controller's decision, according to contents size, or according to an application requesting contents.

As shown in FIG. 15(b), when the contents size is chosen as the criterion for tethering switching, the user may enter a reference size by which tethering switching is carried out. For example, the user can enter the contents size by moving a Selection Bar (SB) with his or her finger.

As shown in FIG. 16(a), when the user selects the option so that an application requesting contents controls the tethering switching, a process of selecting an application can be further carried out. For example, applications using contents are listed up and the user directly chooses a particular application among them. In case a service module is created in the framework layer according to one embodiment of the present invention, the service module chooses a particular application to perform the tethering. In other words, the service module transfers a newly created socket to a predetermined, particular application.

Figure 17:
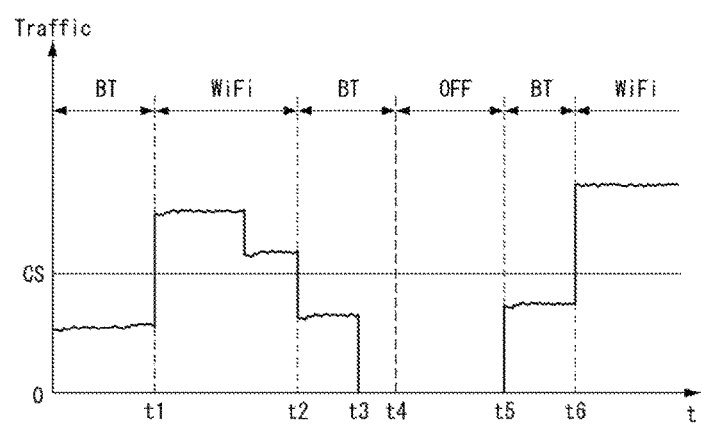
FIGS. 17 and 18 illustrate tethering timing of an electronic device according to one embodiment of the present invention.
Figure 18:
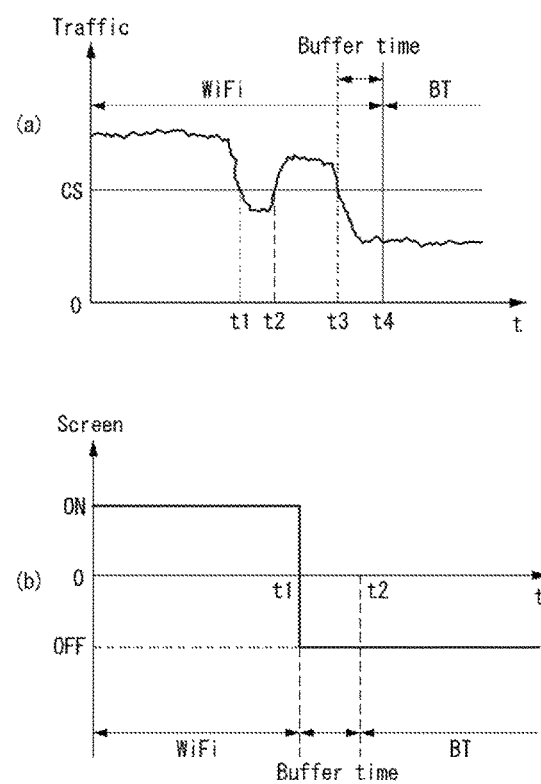

FIGS. 17 and 18 illustrate tethering timing of an electronic device according to one embodiment of the present invention.

As shown in the figures, an electronic device 300 according to one embodiment of the present invention can perform tethering according to a predetermined criterion.

A reference value (CS) by which tethering is carried out may be defined. For example, the reference value (CS) can be determined by the user's choice and/or a control signal of the controller. In case traffic is increased due to a request for contents and the traffic exceeds the reference value (CS), the tethering is switched to be performed by the Wi-Fi module. For example, at t1 time point, tethering is switched from the Bluetooth module to the Wi-Fi module.

If the traffic falls short of the reference value (CS), the tethering can be switched back to the Bluetooth module. For example, at t2 time point, the tethering can be switched from the Wi-Fi module to the Bluetooth module.

When there is no traffic for more than a predetermined time period, the communication module can be deactivated. For example, by deactivating the communication module from t4 to t4 time point, battery consumption can be minimized.

The controller can deactivate the communication module at t4 time point after a predetermined time period from t3 time point at which traffic becomes zero. In other words, if a situation arises where there is a low possibility of using the communication module, the communication module can be deactivated. The communication module can be activated again when traffic occurs.

As shown in FIG. 18(a), the time point at which tethering is switched from the Wi-Fi module to the Bluetooth module may be different from the very time point the traffic goes below the reference value (CS). For example, traffic may be less than the reference value (CS) at t3 time point. However, by taking into account buffer time, the actual switching time point from the Wi-Fi module to the Bluetooth module can be delayed to t4. The buffer time can be used to prevent frequent tethering switching.

As shown in FIG. 18(b), switching between the Wi-Fi and the Bluetooth modules can be determined by a different factor in addition to traffic. For example, activation and deactivation of the display unit may affect the tethering switching.

At t1, the display unit can be turned off. Deactivation of the display unit may include the case where the display unit is dimmed. In other words, deactivation of the display unit may include a case where a user input is not received for more than a predetermined time period and backlight of the display unit is turned off and/or a case where the display unit is completely turned off. This situation may occur as the user does not operate the electronic device and/or the different device any more. Therefore, if the user's additional operation is not applied, it may not matter to receive contents with a relatively low speed.

The controller, inserting buffer time of a predetermined time period after the t1 where the display unit is turned off, may switch to the Bluetooth module. By doing so, the controller can prevent frequent switching beforehand.

Figure 19:
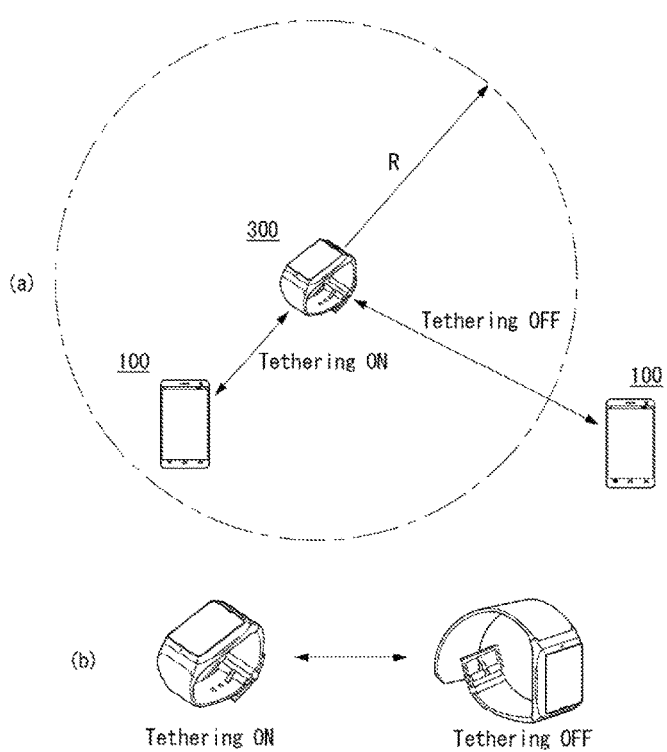
FIG. 19 illustrates a tethering operation of an electronic device according to one embodiment of the present invention.

FIG. 19 illustrates a tethering operation of an electronic device according to one embodiment of the present invention.

As shown in the figure, the electronic device 300 according to one embodiment of the present invention can carry out tethering according to various conditions.

As shown in FIG. 19(a), the electronic device 300 carries out tethering when a different device 100 is located within a predetermined distance R and stops tethering if the different device 100 is beyond the distance. By doing so, the electronic device 300 can prevent beforehand consuming a large amount of current for tethering different devices 100 at a distant location.

As shown in FIG. 19(b), a watch-type electronic device 300 can carry out tethering depending on whether the user wears the electronic device 300. For example, if the user wears the electronic device 300, tethering is activated. If not, tethering is deactivated.

The present invention can be implemented in the form of computer-readable code in a recording medium storing program. Computer-readable recording medium includes all kinds of recording apparatus which stores data that a computer system can read. Examples of a computer-readable recording medium include Hard Disk Drive (HDD), Solid State Disk (SSD), Silicon Disk Drive (SDD), ROM, RAM, CD-ROM, magnetic tape, floppy disk, and optical data storage device. The present invention can also be implemented in the form of carrier waves (for example, transfer through the Internet). Also, the computer may include the controller 180 of the mobile terminal. Therefore, the detailed description above should not be interpreted limitedly from all aspects of the invention but should be regarded as an illustration. The technical scope of the invention should be determined through a reasonable interpretation of the appended claims; all the possible modifications of the present invention within an equivalent scope of the present invention should be understood to belong to the technical scope of the present invention.

Figure 20:
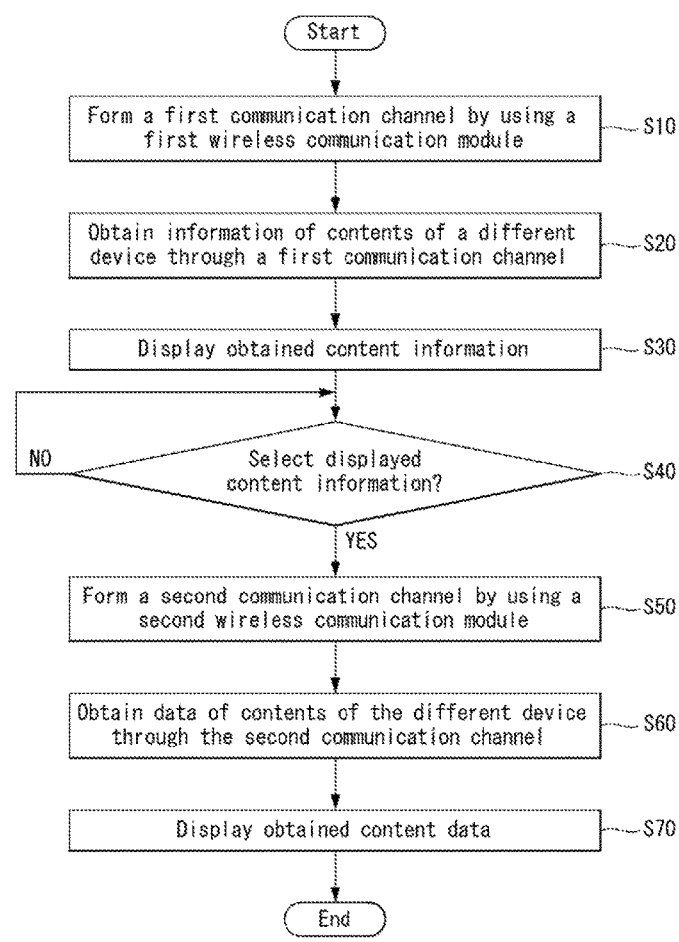
FIG. 20 is a flow diagram illustrating an operating process of the mobile terminal of FIG. 1.

FIG. 20 is a flow diagram illustrating an operating process of the mobile terminal of FIG. 1.

As shown in the figure, the controller 180 of the mobile terminal 100 according to one embodiment of the present invention can carry out the S10 step of forming a first communication channel by using a first wireless communication module 212.

The first wireless communication module 212 can be such a communication module that can be used for communication between the mobile terminal 100 and a different device 200. For example, the first wireless communication module 212 can be a Bluetooth communication module.

The mobile terminal 100 and the different device 200 can form a first communication channel through the first wireless communication module 212. The first communication channel through the first wireless communication module 212 can be such a communication channel which exchanges basic information required for operation between the mobile terminal 100 and the different device 200. For example, information can be obtained through the first communication channel, with which a second and/or a third communication channel can be formed through a second and/or a third wireless communication module 214, 216.

The first communication channel formed through the first wireless communication module 212 may exhibit a lower data exchange speed than a communication channel in a different form. The first communication channel may exhibit a shorter transmission range than a communication channel in a different form. Despite these shortcomings, however, the first communication channel may exhibit better reliability than a communication channel in a different form. Due to this feature, the first communication channel can be used as a communication channel for making a backup of communication channels in other forms. For example, the first wireless communication module 212 can always be in an activated state, exchanging basic data with other devices.

The controller 180 can carry out the S20 step of obtaining content information of a different device 200 through the first communication channel.

As described above, the first communication channel may be such a kind of a communication channel which has been formed based on the first wireless communication module 212 activated commonly between the mobile terminal 100 and the different device 200.

The controller 180 can obtain predetermined information from the different device 200 through the first communication channel formed. For example, the controller 180 can obtain the content information stored in the different device 200.

The content information may not refer to the content itself. The content information may correspond to the information about properties of the content stored in the different device 200. For example, the content information can include at least one of existence of contents, the number of contents, contents title, and contents size.

The first communication channel may exhibit a relatively low transfer speed. Therefore, rather than the content itself, the controller 180 can obtain only the content information through the first communication channel. Since the content information may be of relatively small size compared to the content itself, it can be obtained easily even through the first communication channel showing a slow transfer speed.

The controller 180 can carry out the S30 step of displaying information of obtained contents.

The content information, as described above, may not be the content itself. Therefore, the controller 180 can display a dummy object intended to inform the user about the existence of the corresponding content. For example, the controller 180 may display an icon indicating existence of an image file in a particular, different device 200.

Once the controller 180 obtains a signal to select displayed content information S40, the controller 180 can carry out the S50 step of forming a second communication channel by using a second wireless communication module 214.

The second wireless communication module 214 may comply with communication specifications different from the first wireless communication module 212. For example, the second wireless communication module 214 may be based on the Wi-Fi Direct specifications.

The controller 180 can activate the second wireless communication module 214 of the different device 200. For example, the controller 180 can turn on the second wireless communication module 214 of the different device 200 which has been turned off before. A control command for activating the second wireless communication module 214 of the different device 200 can be transferred through the first communication channel by the first wireless communication module 212.

The controller 180 can carry out the S60 step of obtaining content data of the different device 200 through the second communication channel.

The different device 200 may contain the content itself corresponding to the content information already obtained. The controller 180 can obtain the content itself in the different device 200 through the second communication channel. For example, the controller 180 can obtain the content data of relatively large size through the second communication channel exhibiting a transfer speed higher than the first communication channel.

The controller 180 can carry out the S70 step of displaying data of the obtained content. For example, in case the content is an image, the controller 180 can display the obtained image on the display unit 151.

Figure 21:
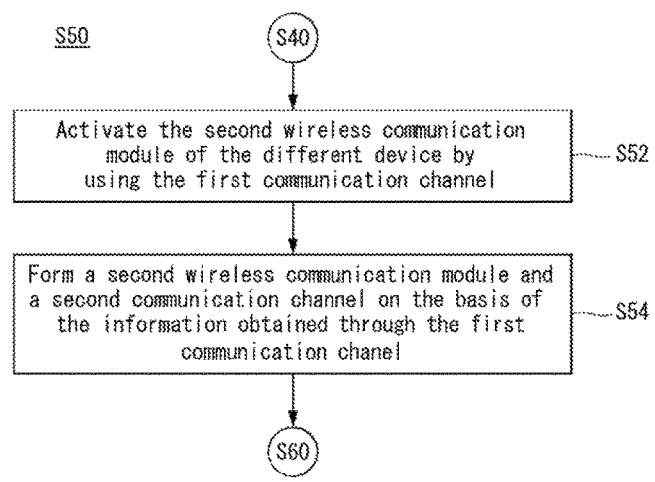
FIG. 21 is a flow diagram illustrating a process of forming a second communication channel by using a second wireless communication module from the operating process of the mobile terminal of FIG. 20.

FIG. 21 is a flow diagram illustrating a process of forming a second communication channel by using a second wireless communication module from the operating process of the mobile terminal of FIG. 20.

As shown in the figure, the step of forming a second communication channel by using a second wireless communication module S50 can comprise the step of activating the second wireless communication module 214 of a different device 200 by using a first communication channel S52.

The second wireless communication module 214 of the different device 200 may be deactivated for the purpose of reducing power consumption. In such a case, there may need to activate the second wireless communication module 214 to form the second wireless channel. A command for activating the second wireless communication module 214 can be transferred through the existing first communication channel.

A step S54 of forming the second wireless communication module and the second communication channel of the different device 200 can be carried out on the basis of the information obtained through the first communication channel.

Through the first communication channel, the controller 180 can obtain the information necessary for forming another communication channel. For example, an address value needed for forming the second communication channel can be obtained through the first communication channel.

The controller 180 can form the second communication channel to the different device 200 on the basis of the information obtained through the first communication channel.

Figure 22:
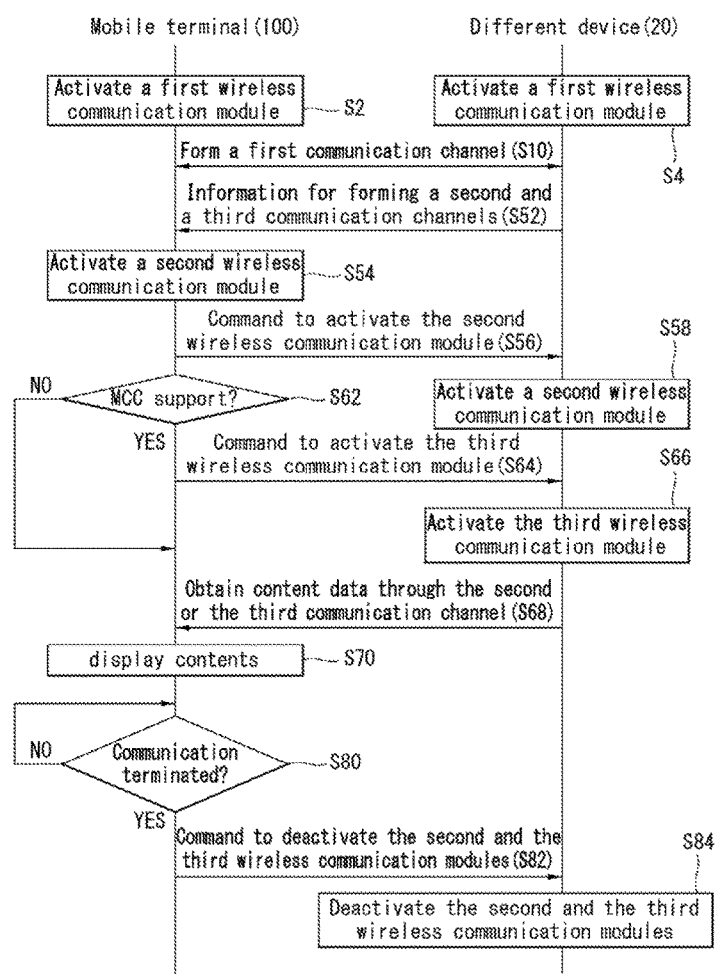
FIG. 22 is a signal flow graph illustrating signal transfer between the mobile terminal of FIG. 1 and a different device.

FIG. 22 is a signal flow graph illustrating signal transfer between the mobile terminal of FIG. 1 and a different device.

As shown in the figure, the mobile terminal 100 according to one embodiment of the present invention can carry out a particular operation while exchanging signals with a different device 200. For example, the mobile terminal 100 can exchange data through a communication channel formed by a plurality of wireless communication modules.

A first wireless communication module of the mobile terminal 100 and a first wireless communication module of the different device 200 can be activated S2, S4. In other words, the first wireless communication module of the two devices can be turned on.

A first communication channel can be formed between the mobile terminal 100 and the different device 200. In other words, the first communication channel can be formed through the activated first wireless communication module.

Through the first communication channel formed, information for forming a second and a third communication channel can be obtained from the different device 200.

The second wireless communication module of the mobile terminal 100 can be activated S54, and a command for activating the second wireless communication module of the different device 200 can be transmitted S56. The command for activating the second wireless communication module of the different device 200 can be transferred through the existing first communication channel.

The different device 200 which receives the command to activate the second wireless communication module from the mobile terminal 100 can activate the second wireless communication module S58.

If the mobile terminal 100 supports the MCC technology S62, a command for activating a third wireless communication module can be transferred to the different device 200. The MCC technology is related to simultaneous activation of the second and the third wireless communication modules. For example, the MCC technology can activate the Wi-Fi Direct communication module and the Wi-Fi communication module at the same time.

The different device 200 which receives the command to activate the third wireless communication module can activate the third wireless communication module S66.

The mobile terminal 100 can obtain content data through the second or the third communication channel S68. The second or the third communication channel can provide a faster transfer speed than the first communication channel. Therefore, the second or the third communication channel can provide faster and more convenience data transfer.

The mobile terminal 100 can display obtained content S70.

The mobile terminal 100 can transfer a command for deactivating the second and the third wireless communication module S82 after communication is terminated S80. The different device 200 which receives the command deactivates the second and the third wireless communication modules S84.

Communication is terminated when there is no more data to be transferred through the second and the third communication channel. In other words, this may correspond to the case where connection of a communication channel is intentionally terminated. In case a communication channel is not employed any more, power consumption can be reduced by deactivating the second and the third wireless communication modules.

In case connection to a communication channel is lost unintentionally, information necessary for forming the second and/or the third communication channel can be obtained again through the first communication channel. The unintentional termination may refer to the case where connection is lost due to a communication failure even if data to be transferred are still existent. Since the second and/or the third communication channel have already been disconnected, information needed to re-establish the second and/or the third communication channel can be obtained through the second communication channel.

Figure 23:
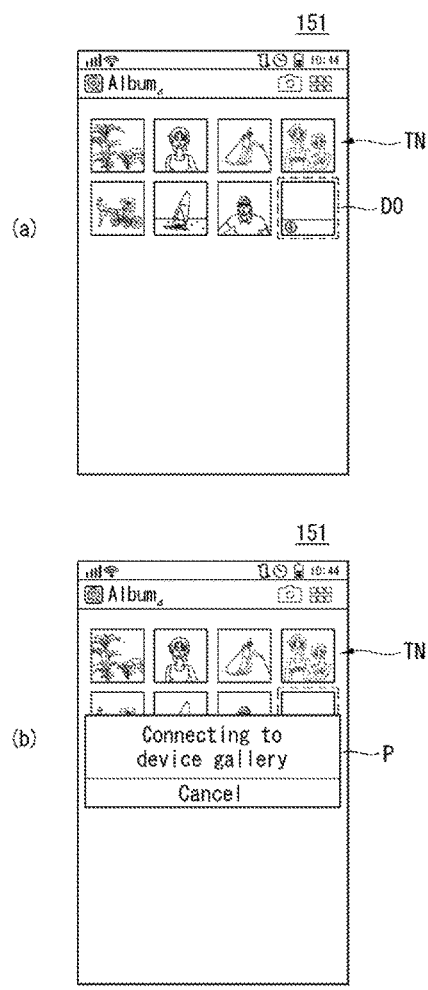
FIGS. 23 and 24 illustrate operation of the mobile terminal of FIG. 20.
Figure 24:
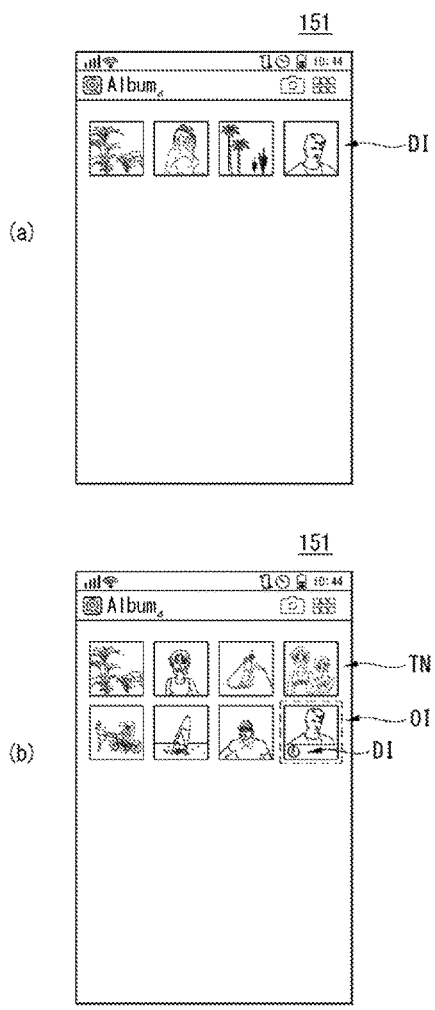

FIGS. 23 and 24 illustrate operation of the mobile terminal of FIG. 20.

As shown in the figures, the controller 180 of the mobile terminal 100 according to one embodiment of the present invention can obtain necessary information through a plurality of communication channels and display the information.

As shown in FIG. 23(a), the controller 180 of the mobile terminal 100 can display an image album on the display 151. The image album can display a first thumbnail TN corresponding to an image stored in the mobile terminal 100. In other words, the first thumbnail TN may be the image corresponding to an image stored in the memory 160 of the mobile terminal 100.

The controller 180 can display a Dummy Object (DO).

The DO may be an icon corresponding to the information obtained through a first communication channel. For example, through the DO, information of an image stored in the different device 200 can be obtained through the first communication channel. In other words, instead of image data itself, at least one of the information including existence of images, the number of images, names, and sizes of the images obtained through the first communication channel can be reflected through the DO.

Different from the first thumbnail (TN), the DO can be displayed in the form of an empty folder. In other words, it may be the case the DO does not have an image itself since image data stored in the different device 200 has not been received yet. The DO is only able to display simple information obtained through the first communication channel, for example, the number of images, names, and sizes of the images.

As shown in FIG. 23(b), if a user's selection with respect to the DO is received, the controller 180 can display a pop-up message (P). The pop-up message (P) can form the second and/or the third communication channel and can be displayed while image data are being received through the communication channel formed.

As shown in FIG. 24(a), if an image stored in the different device 200 is obtained, the controller 180 can display the obtained image (DI). The obtained image (DI) may correspond to the data obtained through the second and/or the third communication channel.

As shown in FIG. 24(b), if there is a user's input commanding returning to an image gallery after the obtained image (DI) is displayed, the controller 180 can display a second thumbnail (OI). The second thumbnail (OI) may be the image corresponding to an image stored in the different device 200. Since data have been already obtained through the second and/or the third communication channel, the second thumbnail (OI) can be displayed on the basis of the obtained data.

Figure 25:
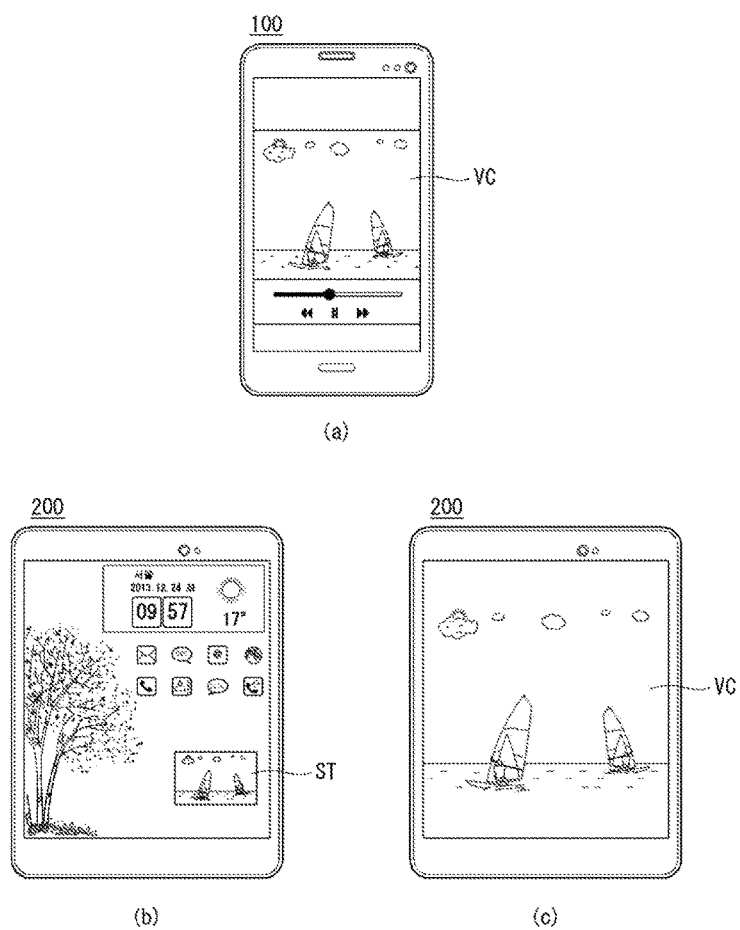
FIG. 25 illustrates another operation of the mobile terminal of FIG. 20.

FIG. 25 illustrates another operation of the mobile terminal of FIG. 20.

As shown in the figure, the mobile terminal 100 according to one embodiment of the present invention can continuously display the content played in the mobile terminal 100 in a different device 200.

As shown in FIG. 25(a), the user can play video contents (VC) in the mobile terminal 100. After watching some part of the video contents (VC), the user may stop watching the video contents.

As shown in FIG. 25(b), the user can use the different device 200. Thumbnails ST of images that the user sees through the mobile terminal 100 can be displayed on the different device 200. The thumbnails ST can be simply displayed in the mobile terminal 100 so that the user can know which images and how far in the thumbnails have been viewed. For example, thumbnails last viewed can be displayed.

As shown in FIG. 25(c), if a thumbnail ST is selected, the different device 200 can continuously play the Video Contents (VC) that the user viewed through the mobile terminal 100. Therefore, the user can watch the content through various types of terminals and in a comfortable manner.

The invention claimed is:

1. An electronic device, comprising:
a first wireless communication module;
a second wireless communication module; and
a controller configured to:
form a first communication channel between the first wireless communication module and an outside device,
obtain information of contents from the outside device via the first communication channel, wherein the information of the contents includes at least one of a total size of the contents, a type of the contents, and a type of an application which has requested the contents,
calculate battery usage, using the information of contents, for downloading the contents through the first communication channel and separately for downloading the contents through a second communication channel,
determine whether to use the first communication channel or the second communication channel based on the calculated battery usage,
obtain the contents from the outside device via the determined communication channel of the first communication channel and the second communication channel, and
activate an initial communication channel of the first communication channel and the second communication channel when the obtaining of the contents are completed,
wherein the second communication channel is formed between the second wireless communication module and the outside device by the controller,
wherein, when a distance between the electronic device and the outside device is greater than a predetermined distance, the controller is configured to deactivate at least one of the first wireless communication module and the second wireless communication module, and
wherein the controller is configured to obtain the contents by forming an application layer, a framework layer, and a kernel layer, where the framework layer includes a service module obtaining the information of the contents requested by a particular application in the application layer and determining whether to form the second communication channel.

2. The electronic device of claim 1, wherein the controller is configured to deactivate the first communication channel when the second communication channel is formed.

3. The electronic device of claim 1, wherein the controller is configured to form the second communication channel when a size of the contents according to the information of the contents is larger than a reference value.

4. The electronic device of claim 1, wherein the controller is configured to obtain the contents through either of the first communication channel and the second communication channel, where a total amount of current for obtaining the contents is smaller than the other channel.

5. The electronic device of claim 1, wherein the controller is configured to deactivate at least one of activated channels of the first communication channel and the second communication channel when acquisition of the contents using at least one of the activated channels of the first communication channel and the second communication channel is not performed for a predetermined time period.

6. The electronic device of claim 1, wherein the controller is further configured to:
obtain a second information from the outside device via the first communication channel for forming the second communication channel, and
form the second communication channel between the second wireless communication module and the outside device based on the second information, while maintaining the first communication channel.

7. The electronic device of claim 6, further comprising:
a third wireless communication module,
wherein, when the outside device supports simultaneous forming of the second communication channel and a third communication channel, the controller is configured to form the second communication channel while maintaining the third communication channel.

8. The electronic device of claim 6, wherein the contents correspond to at least one image, and if the controller obtaining the information of the contents includes at least one of an existence of the at least one image, a number of the at least one image, names, and sizes of the at least one image through the first communication channel, displaying the information, and obtaining a selection signal with respect to the displayed information, the controller is configured to obtain and display the contents including data of the at least one image that can be used to display the at least one image.

9. The electronic device of claim 8 further comprising a display, wherein the controller is configured to display on the display a dummy object corresponding to the information of the contents obtained through the first communication channel.

10. The electronic device of claim 6, wherein the controller is further configured to obtain the second information via the first communication channel when the second communication channel is lost unintentionally.

11. The electronic device of claim 6, wherein, when the second communication channel is terminated intentionally, the controller is configured to deactivate the second communication channel.

12. The electronic device of claim 6, wherein the first wireless communication module is a Bluetooth communication module; at least one of the second and the third wireless communication module is a Wi-Fi communication module and the other one is a Wi-Fi Direct communication module.

13. A control method for an electronic device including a first wireless communication module and a second wireless communication module, the control method comprising:
forming a first communication channel between the first wireless communication module and an outside device;
obtaining information of contents from the outside device via the first communication channel, wherein the information of the contents includes at least one of a total size of the contents, a type of the contents, and a type of an application which has requested the contents;
calculating battery usage, using the information of contents, for downloading the contents through the first communication channel and separately for downloading the contents through a second communication channel;
determining whether to use the first communication channel or the second communication channel based on the calculated battery usage;
obtaining the contents from the outside device via the determined communication channel of the first communication channel and the second communication channel;

activating an initial communication channel of the first communication channel and the second communication channel when obtaining of the contents area completed; and deactivating at least one of the first wireless communication module and the second wireless communication module, when a distance between the electronic device and the outside device is greater than a predetermined distance, wherein the second communication channel is formed between the second wireless communication module and the outside device, wherein the obtaining information comprises:

forming an application layer a framework layer and a kernel layer;

forming a service module on the framework layer: and obtaining information of the contents requested by a particular application in the application layer, and wherein the obtaining includes the service module's determining whether to form the second communication channel on the basis of the information of the contents.

14. The control method of claim 13, further comprising deactivating the first communication channel formed when the second communication channel is formed.

15. The control method of claim 13, wherein the obtaining comprises forming the second communication channel when the size of the contents according to the information of the contents is larger than a reference value.

16. The control method of claim 13, wherein the obtaining comprises obtaining the contents data through either of the first and the second communication channel, where a total amount of current for obtaining the contents data is smaller than the other channel.

17. The control method of claim 13, wherein the obtaining further comprises deactivating at least one of the activated channels of the first communication channel and the second communication channel when acquisition of contents using at least one of activated channels of the first communication channel and the second communication channel is not performed for a predetermined time period.

18. The control method of claim 13, further comprising:

obtaining a second information from the outside device via the first communication channel for forming the second communication channel; and forming the second communication channel between the second wireless communication module and the outside device based on the second information, while maintaining the first communication channel.

* * * * *